United States Patent [19]

Labart

[11] Patent Number: 5,407,478

[45] Date of Patent: Apr. 18, 1995

[54] USE OF SLAKER GRITS AND GREEN LIQUOR DREGS IN ASPHALT PAVING

[75] Inventor: Mark C. Labart, Broadbent, Oreg.

[73] Assignee: International Paper Company, Tuxedo Park, N.Y.

[21] Appl. No.: 239,819

[22] Filed: May 9, 1994

[51] Int. Cl.6 ............................................ C09D 195/00
[52] U.S. Cl. ........................ 106/284.02; 106/284.04
[58] Field of Search ....................... 106/284.02, 284.04

[56] References Cited

U.S. PATENT DOCUMENTS 2,331,394  9/1941  Hjelte .............................. 106/284.04

FOREIGN PATENT DOCUMENTS 57-198751  12/1982  Japan ............................... 106/284.04
0885391  11/1981  U.S.S.R. ........................... 106/284.04

*Primary Examiner*—David Brunsman
*Attorney, Agent, or Firm*—Hoffman, Wasson & Gitler; Michael Doyle

[57] ABSTRACT

An asphalt paving composition composed of crushed rock, oil and a fines fraction selected from the group including green liquor dregs, slaker grits or combinations thereof. The fines fraction replaces conventional sand and produces a competitive product. Utilization of the waste materials frees overcrowded and overused landfill areas.

7 Claims, No Drawings

USE OF SLAKER GRITS AND GREEN LIQUOR DREGS IN ASPHALT PAVING

BACKGROUND OF THE INVENTION

This invention relates to the use of green liquor dregs and slaker grits as part of the aggregate in asphalt concrete pavement.

Green liquor dregs and slaker grits are waste products from the pulp and paper process. Approximately 6,000 to 8,000 cubic yards of the waste material are produced annually and presently discarded in onsite landfills. An alternative use for the waste is desirable because of the high cost of landfilling and the limited availability of landfill areas.

Green liquor dregs are unburned carbon and inorganic solids that result when a smelt is mixed with water. The material is insoluble in water.

Slaker grits are resulting particles that do not react in the slaking process when green liquor and quick lime are mixed under high temperatures and violent agitation to form a slaked lime.

The dregs are removed from the green liquor using a precoat filter with a lime precoat. Green liquor dregs are then scraped from the precoat filter and contain lime, unburned carbon and inorganic solids. The green liquor dregs are primarily calcium and iron compounds, and the slaker grits are predominantly calcium oxide (quick lime). Both of these materials have been characterized as non-hazardous.

Hot mix asphalt concrete paving aggregate compositions usually are composed of a fines fraction, an aggregate crushed rock component, and oil.

The fines fraction is traditionally a fine sand material which can pass through a two hundred mesh screen.

The aggregate component of the mix is traditionally a crushed rock composed of $\frac{1}{2}$ to $\frac{1}{4}$ sized material and $\frac{1}{4}$-sized material and forms the bulk of the composition.

Addition of the oil creates the slurry and completes the asphalt composition.

It is an objective of the present invention to find an alternative use for green liquor dregs and slaker grits waste products.

It is a further object of the present invention to free up space in landfill areas.

It is a further object of the present invention to substitute the fines fraction component of the hot mix asphalt aggregate paving composition with the green liquor dregs and slaker grits waste products.

It is a further object of the unique aggregate composition embodying the invention to obviate the need to add additional anti-stripping agents or additional fines at completion of the composition.

SUMMARY OF THE INVENTION

The invention addresses an asphalt paving aggregate composition composed of crushed rock, oil and a fines fraction made up of green liquor dregs, slaker grits, or combinations thereof. The fines fraction makes up from 1 to 5% by weight of the overall composition. In addition, nearly all of the fraction can pass through a 200 mesh screen.

Utilization of green liquor dregs and slaker grits in an asphalt composition frees up overcrowded landfill areas.

Additionally, the use of the materials obviates the requirement for adding additional fines to the end mix, such as cement, and obviates the requirement for adding anti-stripping agents such as lime.

DETAILED DESCRIPTION OF THE INVENTION

Green liquor dregs and slaker grits are waste products which emerge from pulp and paper processes. Six to eight thousand cubic yards of the waste materials are produced in an average mill annually and discarded in landfill areas. Landfill areas are overcrowded and landfilling is costly.

It has been discovered that green liquor dregs, slaker grits and combinations thereof, are effective substitutes for the fines fraction of aggregate asphalt paving compositions. Fines fractions of paving composition can pass through a 200 mesh screen and compose from 1 to 5% by weight of the aggregate composition. Green liquor dregs are primarily calcium and iron compounds and slaker grits are primarily calcium oxide.

An aggregate asphalt paving compositions embodying the present invention includes: from $88\frac{1}{2}$–94% by weight crushed rock; from 5–$6\frac{1}{2}$% by weight oil such as PBA #5 oil; and from 1 to 5% by weight of a fines fraction selected from green liquor dregs, slaker grits or combinations thereof. The crushed rock component is composed of essentially two gradations of sized material, 30% by weight of $\frac{1}{2}$ to $\frac{1}{4}$ sized material and 70% by weight of $\frac{1}{4}$- sized material.

A preferred asphalt paving composition includes 93% by weight crushed rock aggregate, 6% by weight PBA #5 oil and 1% by weight green liquor dregs and slaker grits in combination. The composition is produced in a hot mix and exhibits excellent slurry formation.

The hot mix asphalt concrete paving aggregate composition embodying the present invention was applied to a parking lot adjacent to a standard mix control to allow visual monitoring and comparison. The standard mix control included finely crushed rock as the fines fraction.

Moisture sensitivity, of each of the areas, was compared. The mixture containing the waste products, green liquor dregs and slaker grits, as the fines fraction performed about the same as the standard mix control.

Other possible uses for the green liquor dregs and slaker grits could be as a substitute for a portion of the base aggregate crushed rock additive as well as a component in asphalt emulsion mixtures.

Although the present invention has been fully described with reference to the preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. An asphalt paving aggregate composition, the improvement comprising substituting the fines fraction of said aggregate composition with green liquor dregs, slaker grits,or a combination thereof.

2. An asphalt paving aggregate composition, as claimed in claim 1, wherein said fines fraction is from 1 to 5% by weight of said aggregate composition.

3. An asphalt paving aggregate composition, as claimed in claim 2, wherein said fines fraction is 1% by weight of said aggregate composition.

4. An asphalt paving aggregate composition comprising crushed rock, oil, and a fines fraction selected from green liquor dregs, slaker grits or combinations thereof.

5. An asphalt concrete paving aggregate composition, as claimed in claim 4, wherein said fines fraction is from 1 to 5% of said aggregate composition.

6. An asphalt paving aggregate compositions, as claimed in claim 4, wherein said fines fraction is 1% by weight of said aggregate composition.

7. An asphalt paving aggregate composition comprising:
a) 93% by weight crushed rock;
b) 6% by weight oil; and
c) 1% by weight fines fraction selected from green liquor dregs, slaker grits and combinations thereof.

* * * * *